United States Patent
Garza et al.

(10) Patent No.: US 8,985,955 B2
(45) Date of Patent: Mar. 24, 2015

(54) TURBINE NOZZLE SEGMENT AND METHOD OF REPAIRING SAME

(75) Inventors: Jose Abiel Garza, McAllen, TX (US);
Wayne Ray Grady, Fairfield, OH (US);
Pawel Mankowski, Warsaw (PL);
Marcin Zak, Warsaw (PL); Marcin Trajer, Warsaw (PL)

(73) Assignee: General Electric Company, Schenectady, NY (US)

( * ) Notice: Subject to any disclaimer, the term of this patent is extended or adjusted under 35 U.S.C. 154(b) by 593 days.

(21) Appl. No.: 13/192,698

(22) Filed: Jul. 28, 2011

(65) Prior Publication Data
US 2012/0027617 A1 Feb. 2, 2012

(30) Foreign Application Priority Data

Jul. 28, 2010 (PL) .......................................... 391986

(51) Int. Cl.
*F01D 5/14* (2006.01)
*B23P 6/00* (2006.01)
*F01D 9/04* (2006.01)
*F01D 5/00* (2006.01)

(52) U.S. Cl.
CPC ........ *F01D 9/04* (2013.01); *F01D 5/005* (2013.01); *Y02T 50/67* (2013.01); *Y02T 50/673* (2013.01); *F05D 2230/80* (2013.01); *F05D 2240/12* (2013.01)
USPC .................................. 416/193 R; 416/196 R (58) Field of Classification Search
USPC ............ 415/209.3, 210.1; 29/888.011, 889.1, 29/889.2, 889.7; 416/193 R, 299 R, 92, 416/196 R, 224
See application file for complete search history.

(56) References Cited

U.S. PATENT DOCUMENTS

| 1,544,318 | A | | 6/1925 | Hodgkinson |
| 2,952,442 | A | | 9/1960 | Warnken |
| 5,037,273 | A | * | 8/1991 | Krueger et al. ............... 416/190 |
| 5,599,165 | A | * | 2/1997 | Elaini et al. ................... 416/190 |
| 5,988,980 | A | * | 11/1999 | Busbey et al. ............ 416/193 R |
| 6,124,568 | A | | 9/2000 | Broderick et al. |

(Continued)

FOREIGN PATENT DOCUMENTS

| EP | 1658924 A1 | 5/2005 |
| EP | 1658924 A1 | 5/2006 |
| EP | 1867423 A1 | 12/2007 |

OTHER PUBLICATIONS

Polish Preliminary Art Report issued in connection with PL Application No. P-391986, Sep. 21, 2010 (unofficial translation).

(Continued)

*Primary Examiner* — Edward Look
*Assistant Examiner* — Jesse Prager
(74) *Attorney, Agent, or Firm* — General Electric Company; Pamela A. Kachur (57) ABSTRACT

A method is provided for repairing a metallic turbine component which includes at least two airfoils interconnected by a mid-span shroud. The method includes: (a) applying a reinforcement plate to the mid-span shroud; (b) applying braze material to at least a portion of a perimeter of the reinforcement plate; (c) heating the component to melt and flow the braze material between the reinforcement plate and the mid-span shroud; and (d) allowing the braze material to cool and solidify so as to bond the reinforcement plate to the mid-span shroud.

10 Claims, 7 Drawing Sheets

(56) References Cited

U.S. PATENT DOCUMENTS

| | | | |
|---|---|---|---|
| 6,164,916 A * | 12/2000 | Frost et al. | 416/189 |
| 6,297,474 B1 | 10/2001 | Kelly et al. | |
| 7,096,664 B2 * | 8/2006 | Nishimoto et al. | 60/302 |
| 7,648,341 B2 * | 1/2010 | Lau | 416/241 R |
| 7,748,601 B2 * | 7/2010 | Ozbaysal et al. | 228/245 |
| 2009/0047132 A1 * | 2/2009 | Riley et al. | 416/190 |

OTHER PUBLICATIONS

Polish Preliminary Art Report issued in connection with PL Application No. P-391986 dated Sep. 21, 2010 along with unofficial translation.

Office Action from US Appl. No. 13/192,698, dated Nov. 22, 2013.

\* cited by examiner

TURBINE NOZZLE SEGMENT AND METHOD OF REPAIRING SAME

BACKGROUND OF THE INVENTION

1. Field of the Invention

The field of this invention relates generally to the repair of gas turbine engine components and more particularly to the repair of turbine components incorporating airfoils with mid-span shrouds therebetween.

2. Description of Related Art

A gas turbine engine includes a compressor that provides pressurized air to a combustor wherein the air is mixed with fuel and ignited for generating hot combustion gases. These gases flow downstream to a turbine section that extracts energy therefrom to power the compressor and provide useful work such as powering an aircraft in flight. Gas turbine engines typically include stationary turbine nozzles that are placed at the entrance of each turbine stage to channel combustion gases into the turbine rotor located downstream of the nozzle. Turbine nozzles are typically segmented around the circumference thereof with each nozzle segment having one or more airfoil vanes disposed between inner and outer bands that define the radial flowpath boundaries for the hot combustion gases flowing through the nozzle. These nozzle segments are mounted to the engine casing to form an annular array.

During operation, nozzle segments are exposed to a high temperature gas stream that can lead to oxidation, corrosion, physical damage, and cracking from thermal cycling. Because nozzle segments are complex in design, are made of relatively expensive materials, and are expensive to manufacture, it is generally desirable to repair them whenever possible.

One known repair process includes brazing cracked turbine components at the crack locations. However, such repair processes are limited by the strength of the brazed joint, which may not be sufficient for further engine operation.

BRIEF SUMMARY OF THE INVENTION

The embodiments of the present invention provide a method for repairing a mid-span shroud of a turbine component with a reinforcement plate.

According to one aspect of the invention, a method is provided for repairing a metallic turbine component which includes at least two airfoils interconnected by a mid-span shroud. The method includes: (a) applying a reinforcement plate to the mid-span shroud, (b) applying braze material to at least a portion of a perimeter of the reinforcement plate; (c) heating the component to melt and flow the braze material between the reinforcement plate and the mid-span shroud; and (d) allowing the braze material to cool and solidify so as to bond the reinforcement plate to the mid-span shroud.

According to another aspect of the invention, a repaired metallic turbine component includes: (a) an engine-run turbine nozzle segment including at least two airfoils interconnected by a mid-span shroud, the mid-span shroud having at least one defect therein, (b) a metallic reinforcement plate disposed adjacent the mid-span shroud; and (c) solidified braze material bonding the mid-span shroud to the reinforcement plate.

According to another aspect of the invention, a method for repairing a metallic turbine component which includes at least two airfoils interconnected by a mid-span shroud is provided. The method includes: (a) applying a build-up of metallic material to the mid-span shroud so as to substantially increase its thickness; and (b) forming the build-up to a shape which is structurally and aerodynamically compatible with the remainder of the nozzle segment.

BRIEF DESCRIPTION OF THE DRAWINGS

The embodiments of the invention may be best understood by reference to the following description taken in conjunction with the accompanying drawing figures in which.

DETAILED DESCRIPTION OF THE INVENTION

Figure 1:
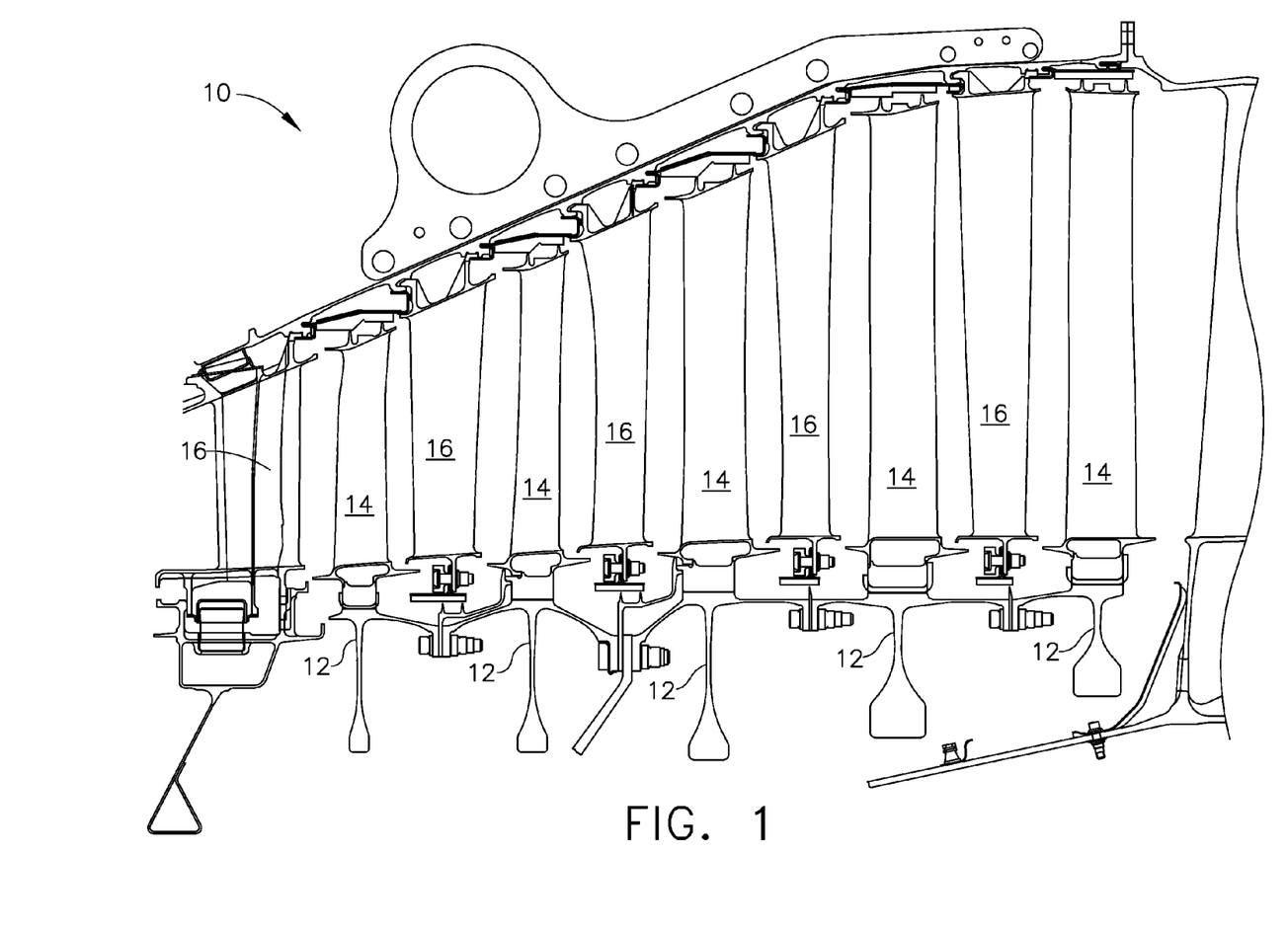
FIG. 1 is a cross-sectional view of a low pressure turbine section of a gas turbine engine.

Referring to the drawings wherein identical reference numerals denote the same elements throughout the various views, FIG. 1 shows a low pressure turbine ("LPT") 10 of a gas turbine engine. It includes a plurality of interconnected rotating disks 12 each carrying an array of airfoil-shaped turbine blades 14 which are sized and shaped to extract mechanical energy from the combustion gases flowing through them. A turbine nozzle 16 is disposed upstream of each stage of turbine blades 12 and serves to direct flow thereto. The illustrated LPT has five stages.

Figure 2:
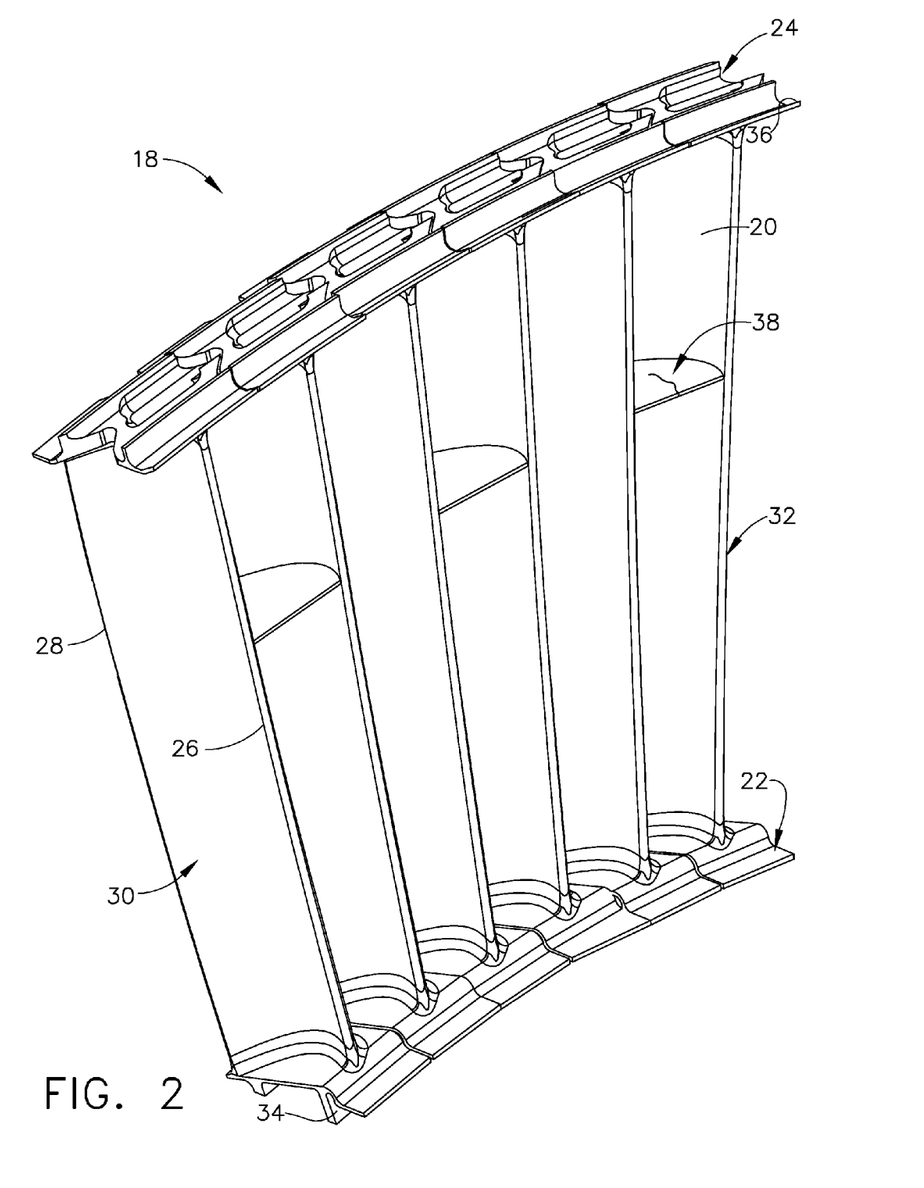
FIG. 2 is a perspective view of a turbine nozzle segment which forms a part of the low pressure turbine shown in FIG. 1.

Each of the turbine nozzles 16 is built up from a plurality of nozzle segments. FIG. 2 illustrates an exemplary turbine nozzle segment 18 having six vanes 20. The vanes 20 are disposed between an arcuate inner band 22 and an arcuate outer band 24. Each vane 20 is an airfoil including a leading edge 26, trailing edge 28, and opposed pressure and suction sides 30 and 32. The vanes 20 are configured so as to optimally direct the combustion gases to a turbine rotor located downstream thereof. The inner and outer bands 22 and 24 define the inner and outer radial boundaries, respectively, of the gas flow through the nozzle segment 18. The inner band 22 has a "hot side" facing the hot gas flowpath and a "cold side" facing away from the hot gas flowpath. It includes conventional mounting structure such as a flange 34. Similarly, the outer band 24 has a cold side and a hot side and includes flanges 36 for mounting the outer band 24 (and thus the nozzle segment 18) to the engine casing.

Such nozzle segments 18 may be made from a cobalt or nickel-based superalloy which has acceptable strength at the elevated temperatures of operation in a gas turbine engine. Some non-limiting examples of commercially-available superalloys include: RENE 77, RENE 80, RENE 142, RENE N4, RENE N5, and RENE N6. The nozzle segment 18 may be cast as a unitary component or built-up from smaller castings.

The nozzle segment 18 includes one or more mid-span shrouds 38. Each mid-span shroud 38 is a plate-like member of a superalloy material identical to the nozzle segment 38 and is generally airfoil-shaped in plan view. Each mid-span shroud 38 extends between the pressure side 30 of one vane 20 and the suction side 32 of the adjacent vane 20. The mid-span shrouds 38 may be cast integrally with the rest of the turbine nozzle segment 18 or manufactured separately and attached to the adjacent vanes by manufacturing methods such as brazing, welding, or other standard industry practices. The purpose of the mid-span shrouds 38 is to tie together adjacent vanes 20 and prevent damage to the vanes 20 from harmonic vibrations during engine operation. In the particular example illustrated, a mid-span shroud 38 is provided between alternating pairs of vanes 20. The exact position of the mid-span shroud 38 along the vanes 20 between the inner and outer bands 22 and 24 will depending upon the engineering requirements of each particular application. Accordingly, the term "mid-span" does not imply a specific location in the spanwise or radial direction. Furthermore, while the repair methods of the embodiments of the present invention are described herein with respect to a six-vane low pressure turbine nozzle segment 18, it should be recognized that the principles of the embodiments of the present invention are equally applicable to any similar component having mid-span shrouds, either manufactured as one unit or separated into two or more segments to dampen harmonic vibrations.

All or part of the turbine nozzle segments 18 may be provided with an environmentally-resistant coating or a thermal barrier coating ("TBC") of a known type.

Figure 3:
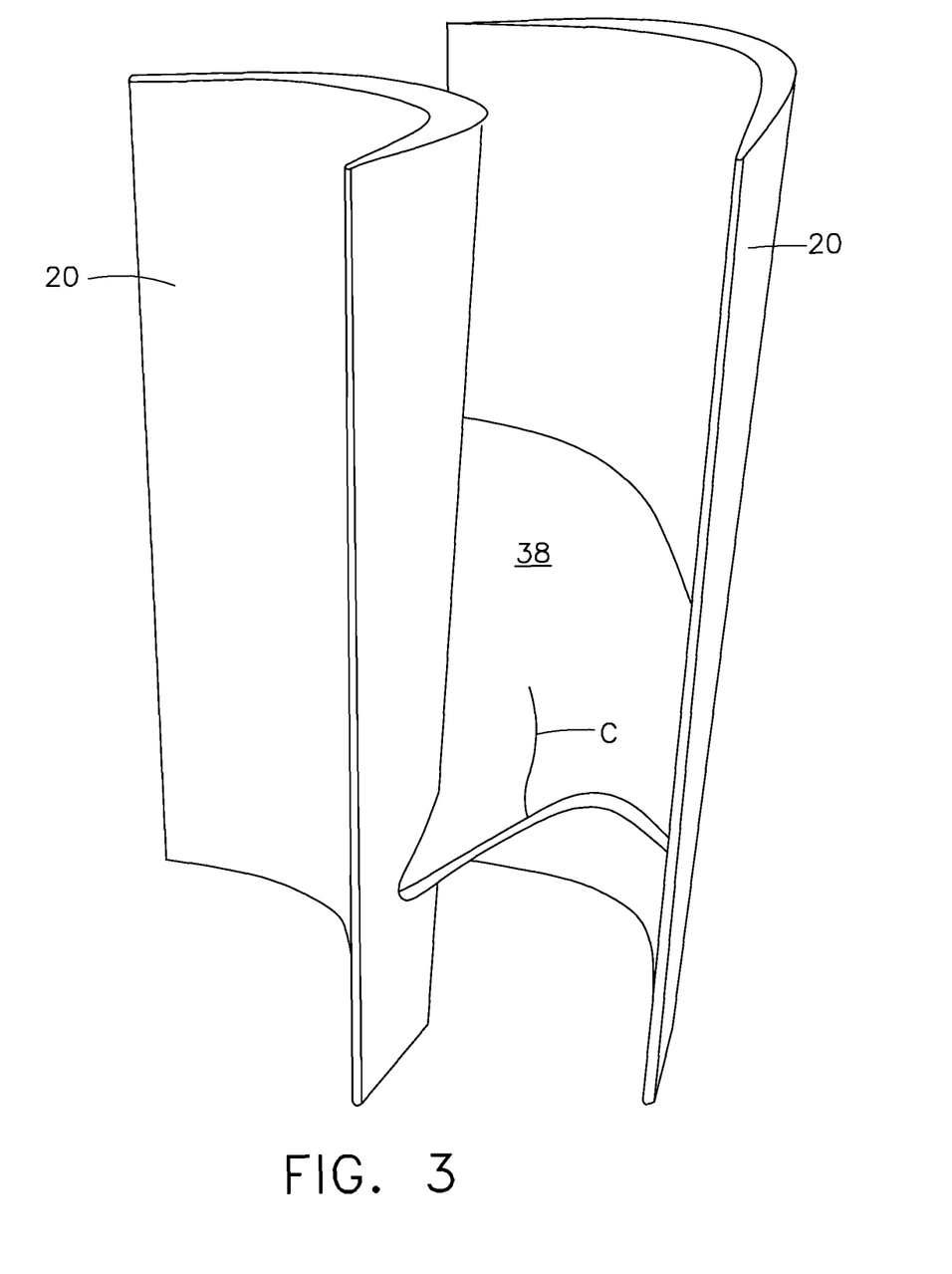
FIG. 3 is a perspective view of a small portion of the turbine nozzle segment shown in FIG. 2, showing a crack therein.

In operation, the mid-span shrouds 38 are subject to damage, especially cracking. FIG. 3 illustrates a small portion of the turbine nozzle segment 18 showing a mid-span shroud 38 with a crack "C" therein. A conventional repair would involve welding, brazing, or another standard industry practice application to the crack C directly, however it has been found that stress levels experienced in this area exceed those that could be handled by conventional braze technologies, and accordingly this type of repair has not been found to provide good yields.

Using the turbine nozzle segment 18 as a working example, a repair may be carried out as follows, with reference to FIGS. 4-7. First, any environmental or TBC coatings (if present) are removed at least from the mid-span shroud 38 using a mechanical stripping method such as grit blasting.

Figure 4:
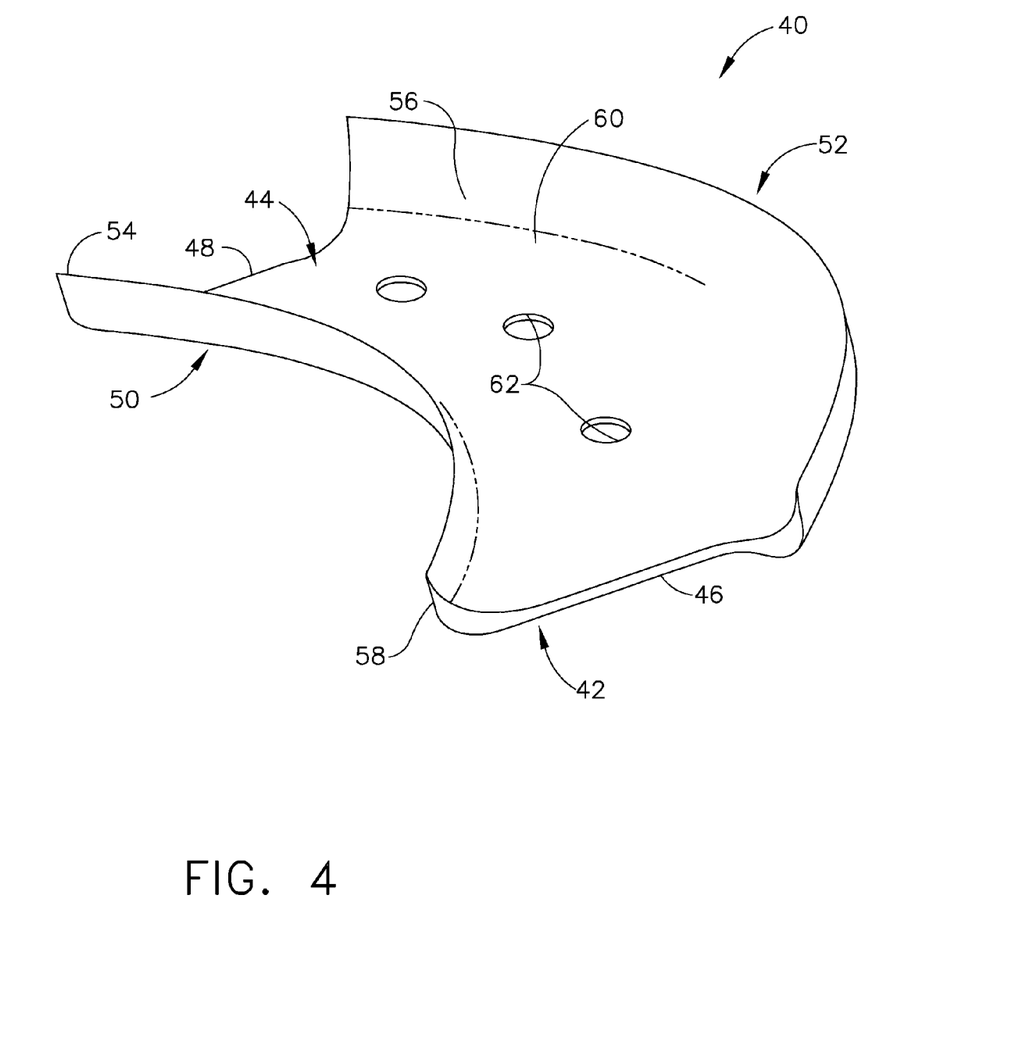
FIG. 4 is a perspective view of a reinforcement plate constructed in accordance with an aspect of the present invention.

Next, a metallic, non-metallic, or combination of metallic and non-metallic reinforcement plate 40 is provided. This type of plate is sometimes generally referred to as a "SPAD", from the term "spare part assembly detail" or "spare part assembly drawing". An exemplary reinforcement plate is shown in FIG. 4. It is generally planar and includes opposed inboard face 42 and outboard face 44, a leading edge 46, a trailing edge 48, and opposed longitudinal edges 50 and 52, one of which is concave and the other of which is convex. The thickness of the reinforcement plate 40 will vary to suit a particular application; in this case it is about 0.76 mm (0.030 in.) thick at its center. In plan view the reinforcement plate 40 is shaped and sized to fit the channel between two vanes 20 and is substantially the same size and Shape in plan view as one of the existing mid-span shrouds 38. The longitudinal edges 50 and 52 incorporate upstanding flanges 54 and 56 respectively, which transition to the inboard face 42 through concave fillets 58 and 60, respectively. One or more witness holes 62 are formed through the reinforcement plate. The witness holes 62 are placed approximately midway between the longitudinal edges 50 and 52. As will be explained further below, the purpose of the witness holes 62 is to ensure that braze material is flowing during a brazing process, and to allow any air pockets to escape from between the mid-span shroud 38 and the reinforcement plate 40. The witness holes 62 are sized to perform these functions without adversely affecting the mechanical strength of the reinforcement plate 40. In the illustrated example, the witness holes have a diameter of about 1.6 mm (0.063 in.). The reinforcement plate 40 may be a casting of the same or similar alloy as the turbine nozzle segment 18 but is not limited to same or similar material as the turbine nozzle segment substrate.

Figure 5:
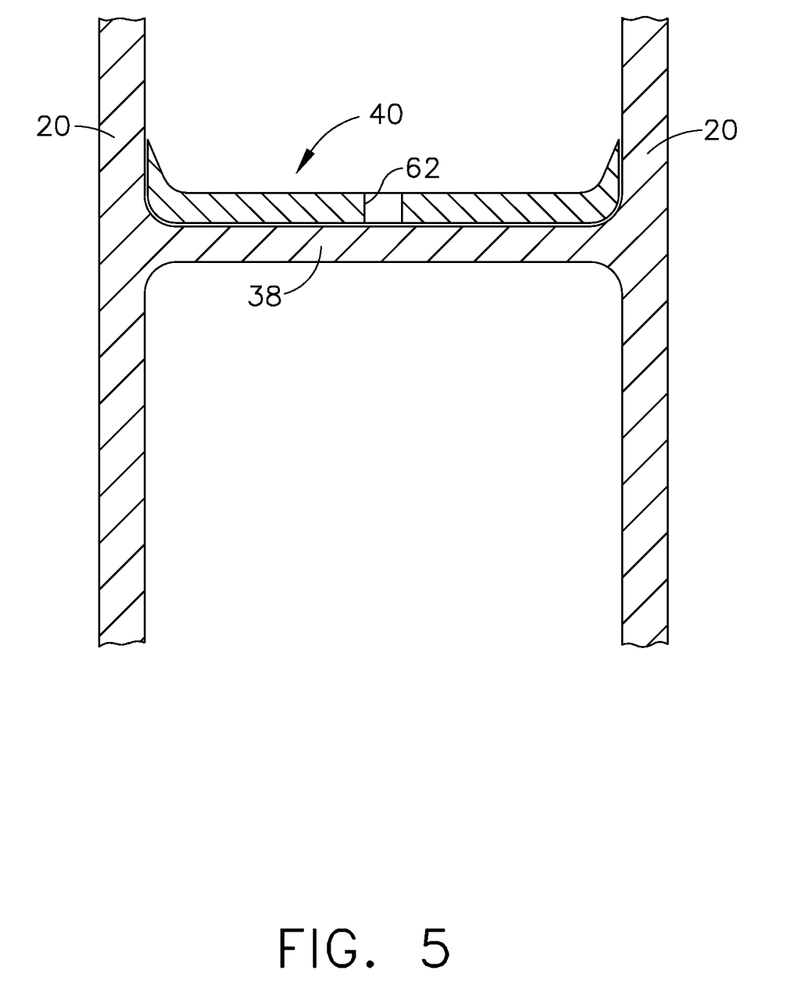
FIG. 5 is a cross-sectional view of a portion of a turbine nozzle segment, showing a reinforcement plate set in position.

The reinforcement plate 40 is placed into position against the mid-span shroud 38 as shown in FIG. 5, and may be tack-welded to the mid-span shroud 38 and/or the vanes 20 to keep it in place during the subsequent braze process.

Figure 6:
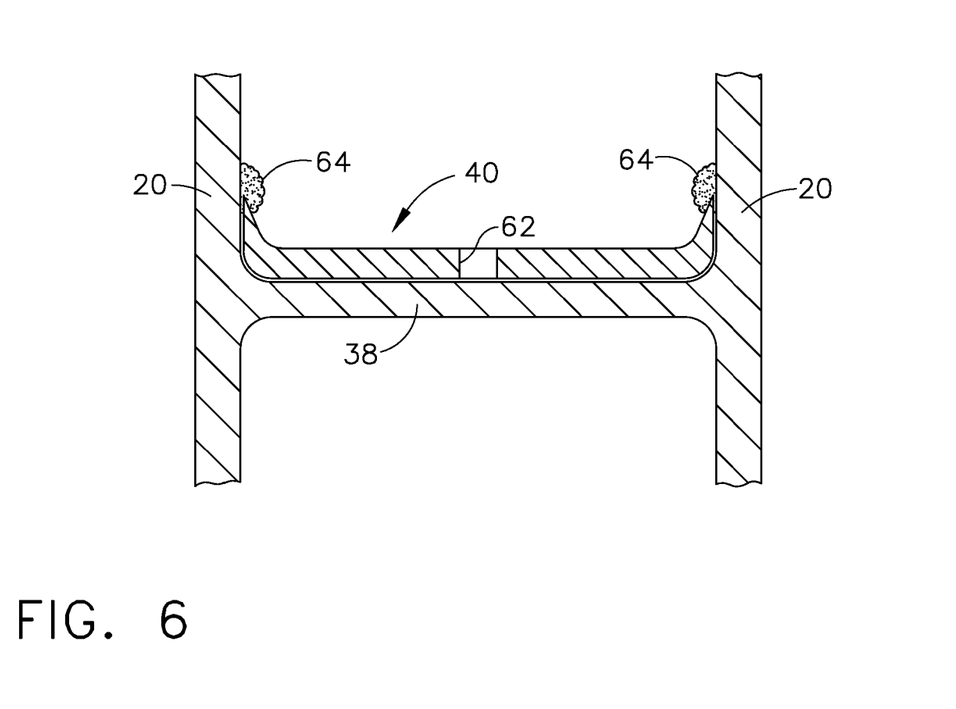
FIG. 6 is a view of the turbine nozzle segment of FIG. 5, showing braze material applied thereto.
Figure 7:
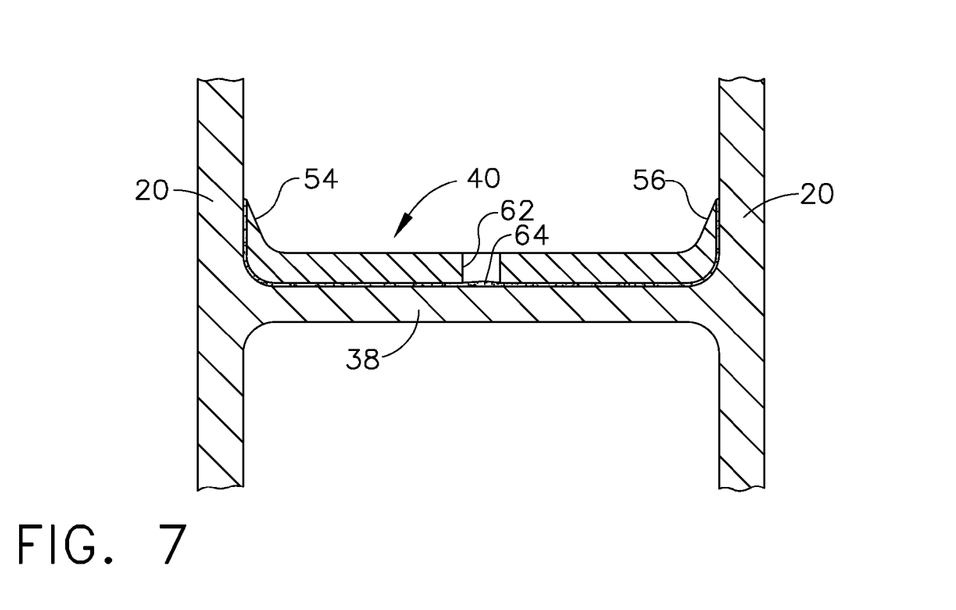
FIG. 7 is a view of the turbine nozzle segment of FIG. 6 after the completion of a braze cycle.

A suitable braze material 64 capable of maintaining braze integrity at the nozzle segment operating temperatures is applied to the junctures between the reinforcement plate 40 and the mid-span shroud 38 and/or the vanes 20, as shown in FIG. 6. If desired, a suitable "stop-off" compound of a known type may be applied to limit migration of the braze material 64.

One example of a suitable braze alloy is commercially available and known as "B93". It has a nominal composition, in weight percent of 14.0 Cr, 9.5 Co, 4.9 Ti, 4.0 W, 4.0 Mo, 3.0 Al, 0.7 B, and 4.5 Si, balance Ni and incidental impurities. It has a solidus temperature of approximately 1093° C. (2000° F.) and a liquidus temperature of approximately 1154° C. (2110° F.). Mixed with a suitable binder of a known type the braze material 64 may be provisioned in the form of a paste or tape, for example.

The turbine nozzle segment 18 with reinforcement plates 40 and applied braze material 64 is placed in a high vacuum furnace (not shown) and subjected to a braze cycle capable of allowing the braze material 64 to transition to the liquid state and begin capillary flow between the plate 40, the mid-span shroud 38, and the vane 20. An example of one such cycle contains a pressure in the furnace of about 0.13 Pa ($1 \times 10^{-3}$ Torr) and the temperature is held at about 1191° C. (2175° F.) to about 1224° C. (2235° F.) for about 10 to 15 minutes, to allow the braze material 64 to melt, and flow between the components. It is then allowed to cool, solidify, and bond the components together.

During braze process, the braze material 64 runs by capillary action into the small spaces between the reinforcement plates 40, the mid-span shrouds 38, and the vanes 20. The flowed-out braze material 64 is depicted schematically in FIG. 7. During the braze cycle the witness holes 62 provide a path for gases to escape from the space between the reinforcement plates 40 and the mid-span shrouds 38, and permit free flow of the braze material 64. Furthermore, because the witness holes 62 are located at the furthest possible distance from the flanges 54 and 56, presence of braze material 64 in the witness holes 62 is good evidence of even and complete braze flow between the two components.

Once the braze cycle is complete, any protective coatings (such as environmental coatings or TBC systems) can be reapplied. The completed turbine nozzle segment 18 is then ready for return to service.

Figure 8:
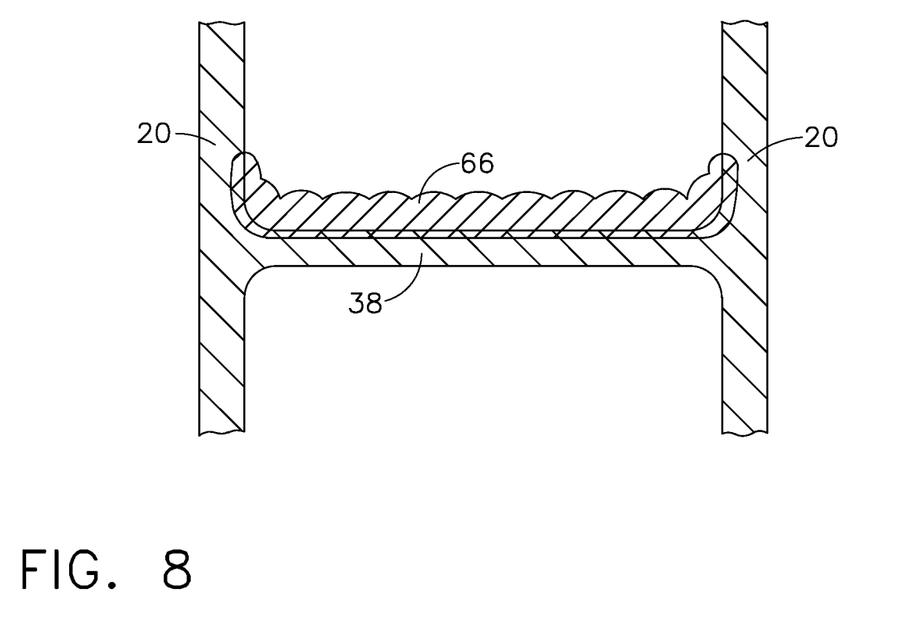
FIG. 8 is a view of a portion of a turbine nozzle segment with a weld build-up applied thereto.
Figure 9:
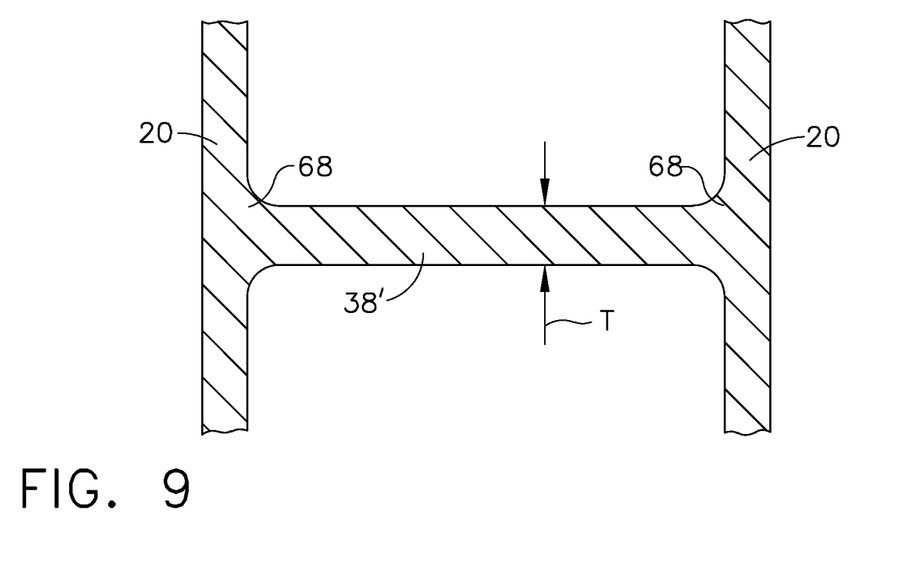
FIG. 9 is a view of the turbine nozzle segment of FIG. 8 after a subsequent forming process.

As an alternative to the above-described process which uses a separate reinforcement plate, the existing mid-span shroud 38 may be built up in thickness by weld cladding or similar process. Examples of known suitable weld processes include, for example, conventional tungsten inert gas ("TIG") or superalloy welding at elevated temperatures ("SWET"). Some examples of SWET processes are disclosed in U.S. Pat. Nos. 6,124,568 and 6,297,474. FIG. 8 illustrates a portion of a nozzle segment which has had weld build-up 66 applied thereto, shown in this example as several discrete passes (beads) along the mid-span shroud 38 and the vanes 20. The weld build-up 66 comprises an alloy identical to or metallurgically compatible with the mid-span shroud. After the weld build-up 66 is applied, it is formed to a shape which is structurally and aerodynamically compatible with the rest of the nozzle segment 18. This may be done, for example, using conventional machine tools or by hand blending using a die grinder or other similar tool, FIG. 9 shows the nozzle segment portion after the weld material has been blended, so as to form in effect, a new thicker mid-span shroud, labeled 38. In this specific example, the modified mid-span shroud 38 has a new thickness "T" about 0.76 mm (0.030 in.) greater after modification. Its surface is smoothly blended into the vanes 20 by fillets 68.

The repair method described above provides a straightforward and economical means of repairing cracked mid-span shrouds. In contrast to conventional braze techniques, welding techniques, or other standard industry practices, it is expected to have better repaired strength and a better yield of the repair process, as compared to conventional brazing, welding, or other standard industry practices. The probability of recracking in the mid-span shrouds 38 is dramatically reduced, thus lowering the cost of ownership of the turbine nozzle segments 18.

The foregoing has described a method for repairing turbine nozzle segments. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A method for repairing a metallic turbine component which includes at least two airfoils interconnected by a mid-span shroud, the method comprising:
   (a) applying a reinforcement plate to the mid-span shroud extending between a pressure side of one airfoil and a suction side of an adjacent airfoil and which ties together said airfoils, wherein the reinforcement plate is substantially the same size and shape as the mid-span shrouds;
   (b) applying braze material to at least a portion of a perimeter of the reinforcement plate;
   (c) heating the component to melt and flow the braze material between the reinforcement plate and the mid-span shroud; and
   (d) allowing the braze material to cool and solidify so as to bond the reinforcement plate to the mid-span shroud.

2. The method of claim 1, wherein the reinforcement plate includes at least one witness hole formed therethrough, the method further comprising allowing the braze material to flow into the witness holes.

3. The method of claim 1 wherein the reinforcement plate includes opposed inboard and outboard faces, a leading edge, a trailing edge, and opposed longitudinal edges extending between the leading and trailing edges, wherein one of the longitudinal edges is concave and the other longitudinal edge is convex.

4. A method for repairing a metallic turbine component which includes at least two airfoils interconnected by a mid-span shroud, the method comprising:
   (a) applying a reinforcement plate to the mid-span shroud extending between a pressure side of one airfoil and a suction side of an adjacent airfoil, wherein the reinforcement plate is substantially the same size and shape as the mid-span shrouds and includes opposed inboard and outboard faces, a leading edge, a trailing edge, and opposed longitudinal edges extending between the leading and trailing edges, wherein one of the longitudinal edges is concave and the other longitudinal edge is convex, and wherein the longitudinal edges incorporate upstanding flanges extending therefrom;
   (b) applying braze material to at least a portion of a perimeter of the reinforcement plate;
   (c) heating the component to melt and flow the braze material between the reinforcement plate and the mid-span shroud; and
   (d) allowing the braze material to cool and solidify so as to bond the reinforcement plate to the mid-span shroud.

5. The method of claim 4 wherein the flanges transition to the outboard face through concave fillets.

6. A repaired metallic turbine component, comprising:
   (a) an engine-run turbine nozzle segment including at least two airfoils interconnected by a mid-span shroud, the mid-span shroud having at least one defect therein and extending between a pressure side of one airfoil and a suction side of an adjacent airfoil,
   (b) a metallic reinforcement plate disposed adjacent the mid-span shroud (38), wherein the reinforcement plate is substantially the same size and shape as the mid-span shrouds; and
   (c) solidified braze material bonding the mid-span shroud to the reinforcement plate.

7. The repaired component of claim 6, wherein the reinforcement plate includes at least one witness hole formed therethrough, and solidified braze material is present in the witness hole.

8. The repaired component of claim 6 wherein the reinforcement plate includes opposed inboard and outboard faces, a leading edge, a trailing edge, and opposed longitudinal edges extending between the leading and trailing edges, wherein one of the longitudinal edges is concave and the other longitudinal edge is convex.

9. The repaired component of claim 8 wherein the longitudinal edges incorporate upstanding flanges extending therefrom.

10. The repaired component of claim 9 wherein the flanges transition to the outboard face through concave fillets.

* * * * *

UNITED STATES PATENT AND TRADEMARK OFFICE
CERTIFICATE OF CORRECTION

| | | |
|---|---|---|
| PATENT NO. | : 8,985,955 B2 | Page 1 of 1 |
| APPLICATION NO. | : 13/192698 | |
| DATED | : March 24, 2015 | |
| INVENTOR(S) | : Garza et al. | |

It is certified that error appears in the above-identified patent and that said Letters Patent is hereby corrected as shown below:

In the specification

In Column 3, Line 1, delete "segment 38" and insert -- segment 18 --, therefor.

In Column 4, Line 26, delete "type" and insert -- type, --, therefor.

In Column 5, Line 7, delete "tool," and insert -- tool. --, therefor.

In Column 5, Line 9, delete "38." and insert -- 38'. --, therefor.

In Column 5, Line 10, delete "38" and insert -- 38' --, therefor.

In the claims

In Column 6, Line 34, in Claim 6, delete "shroud (38)," and insert -- shroud, --, therefor.

Signed and Sealed this
Fifteenth Day of December, 2015

Michelle K. Lee
*Director of the United States Patent and Trademark Office*